Patented Feb. 5, 1924.

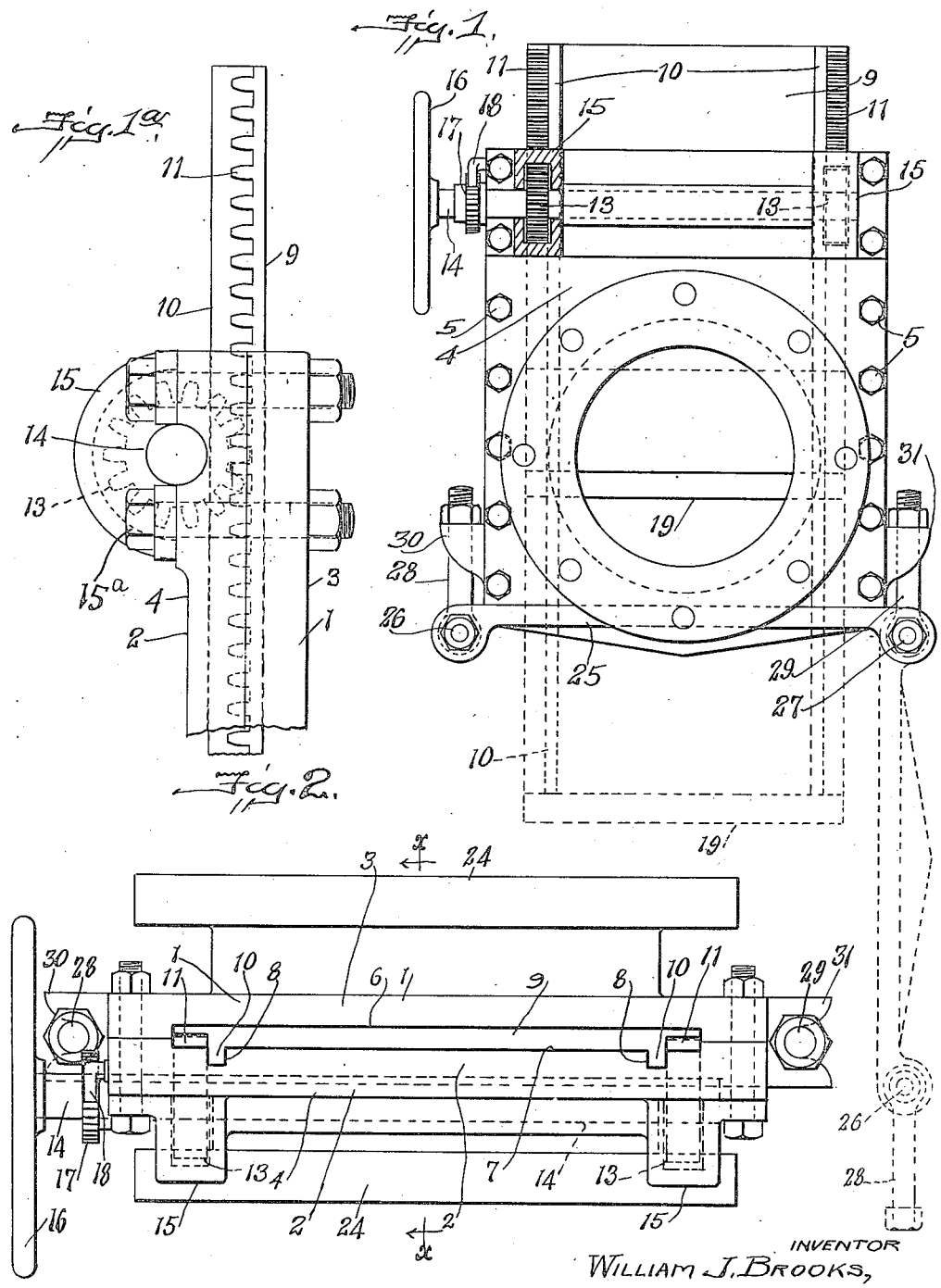

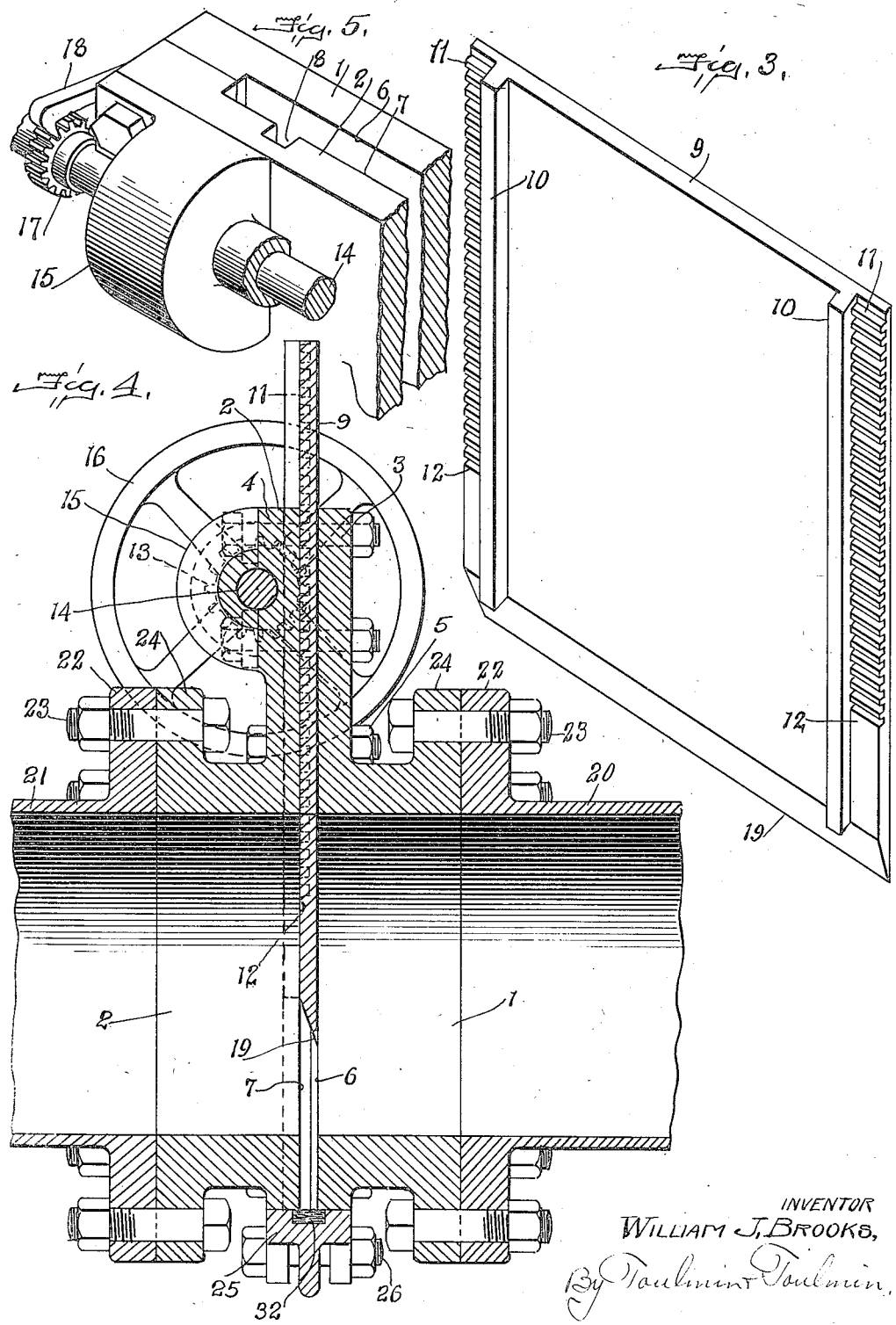

1,483,041

UNITED STATES PATENT OFFICE.

WILLIAM J. BROOKS, OF MIDDLETOWN, OHIO, ASSIGNOR TO GEORGE H. HARVEY, OF MIDDLETOWN, OHIO.

VALVE.

Application filed February 25, 1921. Serial No. 447,782.

*To all whom it may concern:*

Be it known that I, WILLIAM J. BROOKS, a citizen of the United States, residing at Middletown, in the county of Butler and State of Ohio, have invented certain new and useful Improvements in Valves, of which the following is a specification, reference being had therein to the accompanying drawing.

This invention relates to improvements in valves for use in pump lines, particularly pump suction lines, of stuff pumps forming a part of pulp-making machines.

The particular object of the invention is to make it feasible and practicable to close the stuff pump line at times when it is necessary to clean the stuff pump or to repair it.

My invention fulfills this object in a very satisfactory manner, as has been determined by actual use of it. The invention consists, generally, of a two part valve casing, which parts may be readily assembled and disassembled, a removable portion at the bottom in the form of one or more gates which when opened will permit the passage of any foreign matter, such as stones or iron that may interfere with the closing of the valve slide, and of such valve slide mounted slidably in the casing and adapted to be adjusted across the bore or interior of the casing so as to fully open and partially or completely close the bore, as occasion may require.

And added to these general features are numerous specific features to be hereinafter fully explained.

In the accompanying drawings:

Fig. 1 is an end elevation of my valve;

Fig. 1ª is a side elevation of parts thereof;

Fig. 2 is a plan view thereof;

Fig. 3 is an enlarged detail perspective view of the valve slide;

Fig. 4 is a longitudinal sectional view taken on the line $x$—$x$ of Figure 2; and Fig. 5 is a detail perspective view of a portion of the casing showing more particularly how it is formed in two halves with the intervening space to receive the valve slide.

As before indicated the casing of my improved valve comprises two members, designated 1 and 2, respectively, one having a flange 3 and the other a flange 4, by which through the use of bolts and nuts 5 the two halves are secured together.

The halves are formed with cut-away portions to form in the member 1 a groove 6 and in the member 2 a corresponding groove 7 and an additional groove 8. The margins or extreme sides of the valve slide 9 is received and slides in the grooves 6 and 7 while the rib 10 of the slide fits and slides within the groove 8. This is very clearly shown in Figs. 3 and 5.

This valve slide 9 has rack teeth 11, a series near each margin, but which terminate a suitable distance from the lower edge of the slide and leave shoulders 12, which prevent the slide from being run entirely out of the casing in an upward direction, as will be understood when it is seen that the operating pinions 13 meshing with the teeth 11 can only operate the slide upward to the extent of the length of the racks composed of these teeth. When the ends of the racks are reached a tooth in each pinion will come against the shoulders 12, respectively, and thus stop the further upward movement of the slide. This is important to prevent careless employees from improperly running the valve slide entirely out of the valve casing. These pinions 13 are mounted upon a shaft 14 which has its bearings in the walls of the member 2 and of a housing 15, as seen more clearly in Fig. 1ª, these housings being preferably cast separate from the member 2 of the casing, as seen also in Fig. 1ª. The housing 15 is bolted to the member 2 by the bolts and nuts 15ª, which also are utilized in securing together the two members 1 and 2. By reason of this pinion housing being removable it is possible to place the hand wheel on either side of the valve. A worn or broken pinion can also be replaced without disassembling the valve. A hand wheel 16 on the shaft 14 is used to rotate the shaft to adjust and control the positions of the valve. Preferably a ratchet wheel 17 is secured on the shaft 14 and a detent 18 is mounted on the casing and adapted to engage with the ratchet wheel in a manner to prevent the shaft from rotating in the direction which would allow the slide to descend but which will permit the shaft to be positively rotated to raise the slide. To lower it the detent 18 is temporarily lifted from engagement with the ratchet wheel 17.

The lower end of the valve slide is constructed to form a cutting edge 19 so that if any object which can be cut obstructs the passage through the valve casing it can be cut or severed by running the valve slide up and down again, as may be required to sever the object at one or more places, say, first in one place, cutting off a portion of it, and then as the object shifts longitudinally to cut it again and so on as may be required to reduce it to a size when it will not further obstruct either the interior of the valve casing or the stuff pump or other pipe line indicated at 20 and 21. These pipes have flanges 22 by which they can be secured by bolts and nuts 23 to the outer flanges 24 of the valve casing, as seen in Fig. 4.

In order to enable me to remove the valve slide entirely, as for the purpose of resharpening its cutting edge or inserting a new slide in case of breakage, I construct the casing with a removable bottom portion which I term a gate designated 25. It is composed of a long plate having studs 26 and 27 at its ends which pass through it and on which are hung eye-bolts 28 and 29, respectively, which pass between a pair of lugs 30 and 31, respectively, which lugs project from the side of the casing, as shown best in Fig. 1. In this way the gate is normally held in position across the opening formed in the bottom of the casing by the cut-away portion 6 and 7, see Fig. 5. When, however, it is desired to project the valve slide through the casing, as shown in dotted lines in Fig. 1, one or the other of the bolts 28 and 29 is released by unscrewing its nut when it may be slipped from between the lugs 30 or 31, as the case may be, and the gate permitted to drop, as shown in dotted lines in Fig. 1. In this position the opening in the bottom of the valve casing is enclosed and the valve slide may be readily extended through the casing, and, if desired, wholly removed, and at the same time any material that it may be desired to have the slide drag out of the casing or which it may be desired to drop from the casing, can be discharged.

And in the case of such substances as may be cut by the cutting edge 9 of the valve slide the same may be readily done, with a shearing action as the straight cutting edge of the plate coacts with the curved interior of the casing. To prevent dulling the blade when arrested by the gate the latter is grooved and a filling 32 of lead or other material is supplied to make a yieldable bed for the cutting edge to come against.

It will now be seen that with my improved valve I can control the passage of material through the connecting pipe to the stuff pump or other point of destination; that I can cut and chop into small pieces such large fragments as may obstruct the valve casing, this being done by bringing the cutting edge of the slide down upon such object as many times as required; and also that I can force out of the casing by passing the slide entirely through it, and opening the gate, such objects as will be dragged through the opening by the slide or as may pass through such opening as the liquid contents of the pipes and valve discharge.

This valve has been found to be very useful and helpful in such situations as a pipe or pulp line extending to a stuff pump in a paper pulp-making plant.

Having thus fully described my invention, what I claim as new and desire to secure by Letters Patent, is:—

1. In a valve of the character described, the combination, with two members comprising a casing, a valve slide mounted to slide back and forth across the casing and having a cutting edge, and a gate having a bed of yieldable material against which the cutting edge of the blade may contact and secured to the casing in a manner to be held closed or opened.

2. In a device of the character described, a conduit, a wide valve extending on either side of the conduit, said valve having a rack at either side thereof, a shaft extending the full width of the valve and having similar pinions to mesh with said racks and detachable housings for the pinions whereby the shaft carrying the pinions may be turned end for end.

3. In a device of the character described, a conduit having flanges at one side thereof and a wide valve closing the conduit having a rack at either side thereof, a ledge on the inner side of both racks, grooves in one of the flanges in which said ledges lie, a shaft extending the full width of the valve and having pinions thereon coacting with the racks, a groove extending entirely through the sides of the conduit through which the valve may be moved to project beyond the conduit on both sides thereof.

4. In a device of the character described, a conduit, a valve for closing the conduit, said valve having a sharpened edge, a groove in the conduit wall through which said valve may be moved to dispose on the outside of the conduit, its sharpened edge, and a detachable covering for the groove having therein a yieldable material against which the cutting edge of the valve may be brought when the cover is in place.

In testimony whereof, I affix my signature.

WILLIAM J. BROOKS.